United States Patent [19]
Morad

[11] Patent Number: 5,842,810
[45] Date of Patent: Dec. 1, 1998

[54] QUICK RELEASE ADAPTOR FOR ADAPTING A MOP HEAD AND A MOP HANDLE

[75] Inventor: Fred I. Morad, Toluca Lake, Calif.

[73] Assignee: Worldwide Integrated Resources, Inc., Glendale, Calif.

[21] Appl. No.: 751,862

[22] Filed: Nov. 18, 1996

[51] Int. Cl.[6] .................................................. B25G 3/00
[52] U.S. Cl. ....................... 403/301; 403/299; 403/320; 403/325; 15/145; 15/147.1; 15/229.2
[58] Field of Search .................................. 15/145, 147.1, 15/147.2, 144.4, 228, 229.1, 229.2, 150, 151, 152, 153; 403/299, 104, 105, 106, 300, 301, 307, 306, 319, 320, 325

[56] References Cited

U.S. PATENT DOCUMENTS

| | | | |
|---|---|---|---|
| 1,462,794 | 7/1923 | Kumpunen | 15/229.1 X |
| 2,729,841 | 1/1956 | Littleton | 15/229.2 |
| 2,905,958 | 9/1959 | Sannes | 15/229.2 |
| 4,417,364 | 11/1983 | Hammond | 15/229.2 X |
| 5,172,447 | 12/1992 | Tomm | 403/299 X |
| 5,230,596 | 7/1993 | Morad | 15/153 X |
| 5,366,314 | 11/1994 | Young | 403/299 |

FOREIGN PATENT DOCUMENTS 0122891  2/1919  United Kingdom .

*Primary Examiner*—Harry C. Kim
*Assistant Examiner*—William L. Miller
*Attorney, Agent, or Firm*—Thomas I. Rozsa; Tony D. Chen

[57] ABSTRACT

An adaptor for quickly connecting and releasing a T-shaped bar which holds a mop head and a mop handle to form a complete mop for use. The T-shaped bar has a horizontal base portion and a vertical threaded portion. The horizontal base portion is adapted to the mop head, while the vertical threaded portion is adapted to the adaptor. A mop handle or stick is then adapted to the rear of the adaptor. The adaptor has a spring biased pawl which is pivotally mounted thereon, such that when the tip of the pawl is engaged with the vertical threaded portion of the T-shaped bar by the spring, it locks the movement of the adaptor. However, by simply rotating the adaptor, the adaptor will be further threaded on the vertical threaded portion of the T-shaped bar to precisely adjust the tightness of the adaptor to the T-shaped bar. When the pawl is pressed against the spring, an individual can quickly release the adaptor from the vertical portion of the T-shaped bar, which in turn releases the mop head.

28 Claims, 4 Drawing Sheets

QUICK RELEASE ADAPTOR FOR ADAPTING A MOP HEAD AND A MOP HANDLE

BACKGROUND OF THE INVENTION

1. Field of the Invention

The present invention generally relates to the field of mops. More particularly, the present invention relates to adaptors for adapting a mop head and handle to form a mop.

2. Description of the Prior Art

The inventor and applicant of the present invention is also the patentee of U.S. Pat. No. 5,230,596 issued on Jul. 27, 1993 (hereafter "the '596 Patent"). The inventor is aware of the prior art mop holders which were disclosed in the '596 Patent. While the patentee's prior art slidable and threadable quick release locking nut for quick change type mop holders functions adequately, the patentee has continuously sought to further improve mop holders for the consumer industry.

The '596 Patent discloses an improved quick release locking nut for quick change type mop holders. The mop holder has a frame attachable to a mop stick and a clamping member for securing mop fill. The quick release locking nut is slidably mounted on a central shank of the frame, and has a pivotally mounted pawl which is biased by a spring. The pawl has inner screw threads which engage with the outer screw threads on the central shank, in order to lock the quick release locking nut on the central shank for preventing the clamping member from sliding on the central shank. When the pawl is pressed against the spring and therefore is disengaged from the central shank, the quick release locking nut is unlocked and can slide on the central shank for allowing the clamping member to slide on the central shank so that the mop clamp can be released.

There is a need for an adaptor which can quickly fasten a mop head and a mop handle to form a complete mop. It is also desirable to provide an adaptor, where a user can quickly release the mop head from the adaptor by pressing a lever to release without getting his or her hands soiled. The mop head can then be thrown away after use or the mop head can be washed for further use.

SUMMARY OF THE INVENTION

The present invention is a unique quick release adaptor for quickly connecting and releasing a T-shaped bar member which holds a mop head and a mop handle to form a complete mop for use. The present invention adaptor also quickly releases the T-shaped bar member which holds the mop head so that an individual does not have to get his or her hands soiled to remove the mop head from the handle.

It is known that a prior art T-shaped bar member has a horizontal base portion and a vertical portion. The horizontal base portion retains the mop head, while the vertical portion can be adapted to the present invention adaptor. A mop handle or stick can then be installed to the rear of the adaptor.

The quick release adaptor comprises a spring biased pawl which is pivotally mounted thereon, such that when the tip of the pawl is engaged with the vertical portion of the T-shaped bar member by the spring, it locks the movement of the adaptor. However, by simply rotating the adaptor, the adaptor will be further threaded on the vertical portion of the T-shaped bar member to precisely adjust the tightness of the adaptor to the T-shaped bar member. When the pawl is pressed against the spring, an individual can quickly release the adaptor from the vertical portion of the T-shaped bar member, which in turn releases the mop head which can be thrown away after use or washed without having the individual's hands soiled.

It is therefore an object of the present invention to provide an adaptor for adapting a T-shaped bar member or the like which holds a mop head and a mop handle thereto, and thereby forms a complete mop for use.

It is an additional object of the present invention to provide an adaptor which comprises a spring biased pawl pivotally mounted thereon, such that when the tip of the pawl is engaged with the T-shaped bar member by the spring, it locks the movement of the adaptor. However, by simply pressing the pawl against the spring, an individual can quickly release the T-shaped bar member which holds the mop head, which in turn falls out from the adaptor after use so that the individual will not get his or her hands soiled.

It is a further object of the present invention to provide an adaptor, where inner screw threads are provided on the engaging tip of the spring biased pawl so that the spring biased pawl is engaged to the vertical threaded portion of the T-shaped bar member, so that the adaptor can be further threaded on the vertical threaded portion of the T-shaped bar member to precisely adjust the tightness of the adaptor.

It is another object of the present invention to provide an apparatus which includes an adaptor for adapting a mop head and a mop handle thereto, and thereby forms a complete mop for use.

In the preferred embodiment, the present invention comprises a quick release adaptor member used in conjunction with a standard T-shaped bar member which retains a mop head.

In an alternative embodiment, the present invention apparatus comprises an adaptor member, a circular disc member, and a cone shaped cover member, where the cone shaped member is adapted to the circular disc member and the adaptor member is adapted to the circular disc member.

In another alternative embodiment, the present invention apparatus comprises an adaptor member, a circular disc member and a shaft member, where the shaft member is press fitted to the circular disc member which retains a mop head and the adaptor member is adapted to the shaft member.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
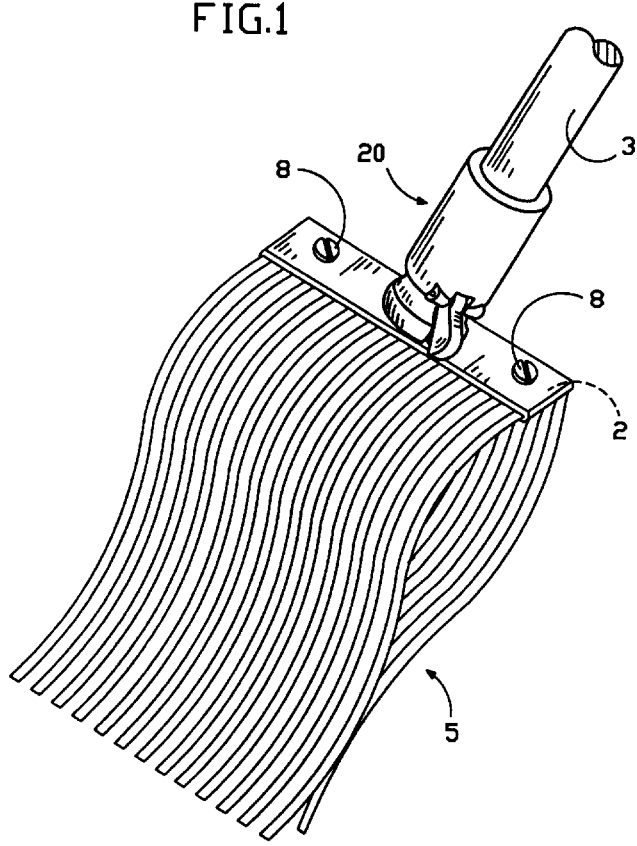
FIG. 1 is an illustration of the present invention adaptor adapted to a T-shaped bar, which holds a mop head, and a mop handle to form a complete mop.
Figure 4:
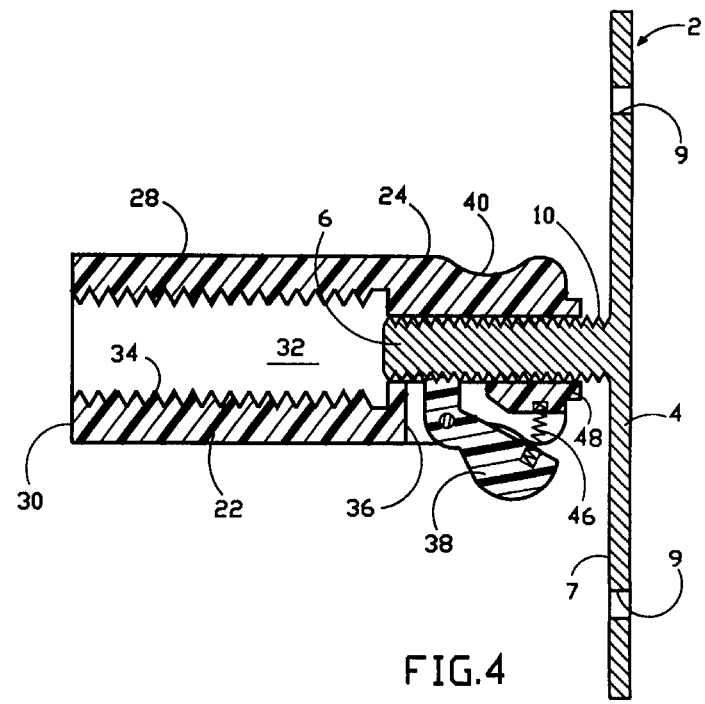
FIG. 4 is a longitudinal cross-sectional view of the present invention quick release adaptor adapted to the T-shaped bar which holds the mop head.

Referring to FIG. 1, there is shown an illustration of the present invention quick release adaptor member 20 for adapting and retaining a standard T-shaped bar member 2 which holds a standard mop head 5 and a standard mop handle 3 thereto. Referring to FIGS. 1 and 4, the T-shaped bar member 2 has a horizontal base portion 4 and a vertical portion 6 with external screw threads 10. The vertical portion 6 of the T-shaped bar member 2 is inserted through an aperture (not shown) provided on the mop head 5, such that the surface 7 of the horizontal base portion 4 abuts against the mop head 5 and is retained thereto by two opposite screws 8. The two screws 8 are inserted through two apertures 9 provided on the horizontal base portion 4 of the T-shaped bar member 2 and fastened by nuts (not shown). The screws 8 may be any conventional fastening means, such as rivets for retaining the horizontal base portion 4 to the mop head 5.

Figure 5:
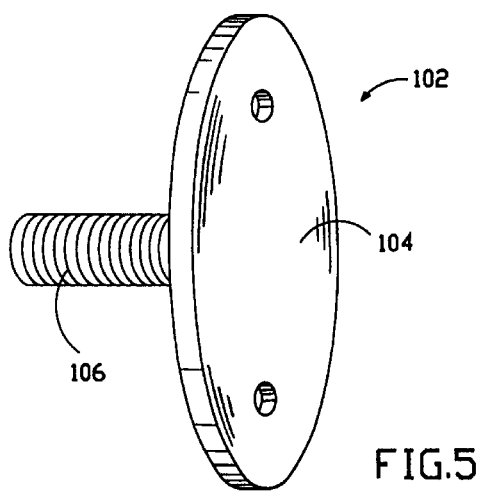
FIG. 5 is a perspective view of an alternative component used for adapting a mop head to the present invention quick release adaptor.

It will be appreciated that the T-shaped bar member 2 is not limited to the illustration shown in FIG. 4. It is emphasized that while the T-shaped bar member 2 is preferred with the present invention adaptor member 20, it is also within the spirit and scope of the present invention to utilize, for example, a circular disc member 102 which has a horizontal circular base portion 104 and a vertical portion 106 with external screw threads as shown in FIG. 5 or any other conventional part which may be attached to the mop head. The circular disc member 102 is installed exactly the same as the T-shaped bar member 2 described above, and the description thereof will not be repeated.

Figure 2:
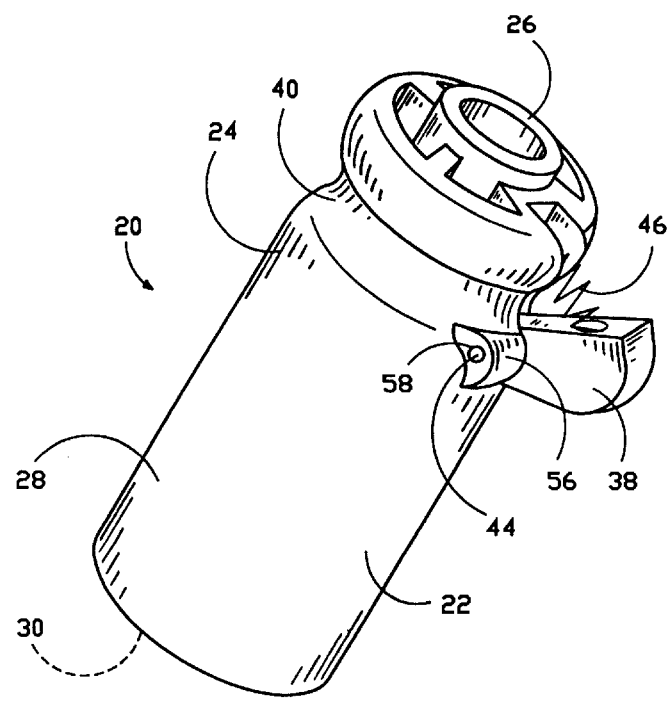
FIG. 2 is a perspective view of the present invention quick release adaptor.
Figure 3:
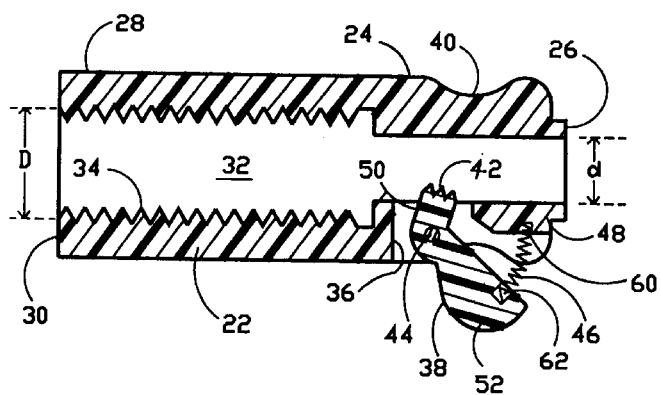
FIG. 3 is a longitudinal cross-sectional view of the present invention quick release adaptor.

Referring to FIGS. 2 and 3, there is shown a perspective view of the present invention adaptor member 20 which has a generally cylindrical shaped body 22. The cylindrical shaped body 22 comprises a proximal portion 24 with a proximal open end 26, a distal portion 28 with a distal open end 30, a central slot 32 extending from the proximal open end 26 to the distal open end 30 (see FIG. 3), and a side slot 36 located on the proximal portion 24. There is also an annular groove 40 provided on the exterior sidewall of the cylindrical body 22 of the adaptor member 20 that enables a user to handle the adaptor member 20 more easily, so that the user can firmly grip the body 22 to rotate it.

Referring to FIGS. 3 and 4, the central slot 32 has two different inner diameters, a smaller inner diameter "d" is for the proximal portion 24 and a larger inner diameter "D" for the distal portion 28. The smaller inner diameter "d" of the central slot 32 is used for accommodating the vertical portion 6 of the T-shaped bar member 2 while the larger inner diameter "D" has inner screw threads 34 for adapting the mop handle 3 to be threadedly engaged therein.

It will be appreciated that the present invention adaptor member 20 may be manufactured without inner screw threads 34 located on the distal portion 28 of the adaptor member 20 so that a mop handle 3 may be, for example, press fitted therein.

The side slot 36 interconnects with the central slot 32 on the proximal portion 24 and accommodates a pawl 38. A thin wall 48 is disposed between the central slot 32 and the side slot 36 to partially divide them, so the side slot 36 is partially connected with the central slot 32. The pawl 38 has an inwardly protruded tip 50 and an outwardly extended tail 52. The tip 50 is provided with inner screw threads 42 for engaging with the screw threads 10 of the vertical portion 6 of the T-shaped bar member 2 (see FIG. 4). The pawl 38 is pivotally mounted in the side slot 36 by a roll pin 44 and biased by a coil spring 46. There are two opposite protruding bosses 56 (only one is shown in FIG. 2) located on both sides of the pawl 38 and attached on the exterior sidewall of the cylindrical shaped body 22 of the adaptor member 20. Each protruding boss 56 has an aligned hole 58 therein, wherein the tip 50 is positioned therebetween, and a hole on the pawl 38, all for receiving the roll pin 44. In addition, there is an outward facing recess 60 provided on the thin wall 48, and an inward facing recess 62 provided on the pawl 38, for adapting the ends of the coil spring 46 respectively. As the pawl 38 is pivoted by the roll pin 44, it is biased by the coil spring 46, where its tip 50 is extending into the central slot 32 of the adaptor member 20 and its tail 52 is extending out of the side slot 36. The pawl 38 and the spring 46 are securely attached to the cylindrical shaped body 22 of the adaptor member 20. The width of the pawl 38 is approximately the same as the width of the side slot 36, so that when the spring 46 is installed in the side slot 36, it is not exposed to outside of the body 22 of the adaptor member 20.

Once the vertical portion 6 of the T-shaped bar member 2 is installed within the central slot 32 of the cylindrical shaped body 22 of the adaptor member 20, the screw threads 10 on the vertical portion 6 are engaged with the inner screw threads 42 on the tip 50 of the spring-biased pawl 38, where the tail 52 of the pawl 38 is not pressed. As the tail 52 of the pawl 38 is not pressed by the user, the pawl 38 will be biased by the coil spring 46. The pawl 38 is biased by the coil spring 46 such that its tip 50 is engaged with the vertical portion 6 of the T-shaped bar member 2. The adaptor member 20 is locked in place and prevents the vertical portion 6 of the T-shaped bar member 2 from sliding out from the adaptor member 20. The adaptor member 20 may be further threaded on the vertical portion 6 of the T-shaped bar member 2 to precisely adjust the tightness of the adaptor member 20 by further pushing the adaptor member 20 towards the T-shaped bar member 2 and rotating the body 22 in a clockwise direction or counter-clockwise direction, such that the inner screw threads 42 on the tip 50 of the pawl 38 engage with the screw threads 10 on the vertical portion 6 of the T-shaped bar member 2.

When the tail 52 of the pawl 38 is pressed against the coil spring 46, the vertical portion 6 of the T-shaped bar member 2 is released from the central slot 32 of the adaptor member 20, and the tip 50 of the pawl 38 is disengaged from the vertical portion 6 of the T-shaped bar member 2, which allows the vertical portion 6 of the T-shaped bar member 2 to slide freely out from the body 22 of the adaptor member 20. The T-shaped bar member 2 is slidable within the adaptor member 20 as the pawl 38 is pressed, thereby releasing the T-shaped bar member 2 from the adaptor member 20, which thereby becomes a very quick operation so that the T-shaped bar member and the mop head may quickly be released from the adaptor member 20 to be thrown away without having a person getting his or her hands soiled.

The present invention conforms to conventional forms of manufacture or any other conventional way known to one skilled in the art. The adaptor member 20 can be made from several materials. By way of example, the adaptor member 20 can be made of molded plastic or any other suitable material. The manufacturing process which could accommodate the construction of the adaptor member may be injection, thermoform, etc. or other molding process.

Figure 6:
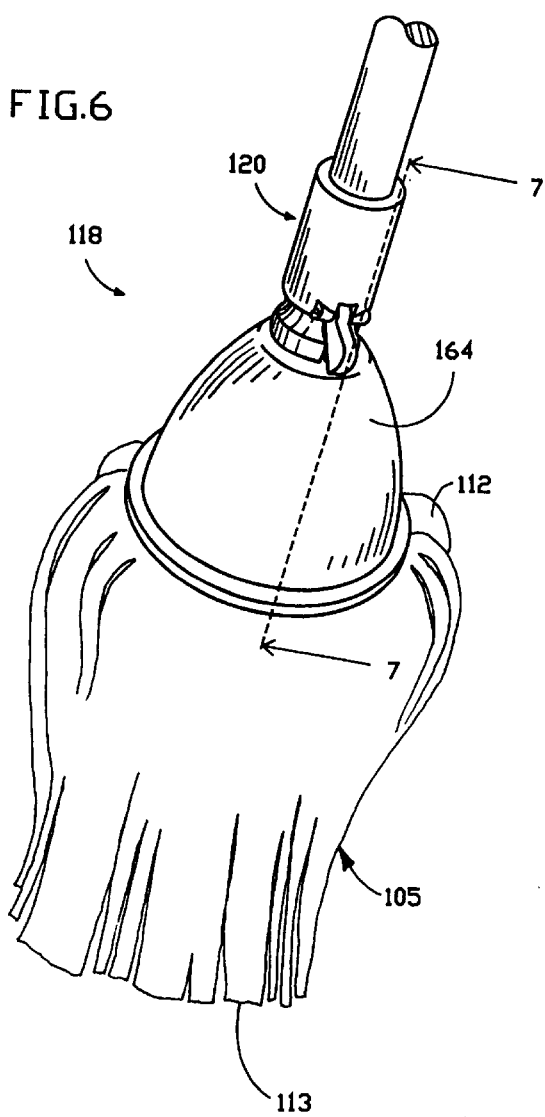
FIG. 6 is a perspective view of an alternative embodiment of the present invention apparatus used for adapting a mop head and a mop handle.
Figure 7:
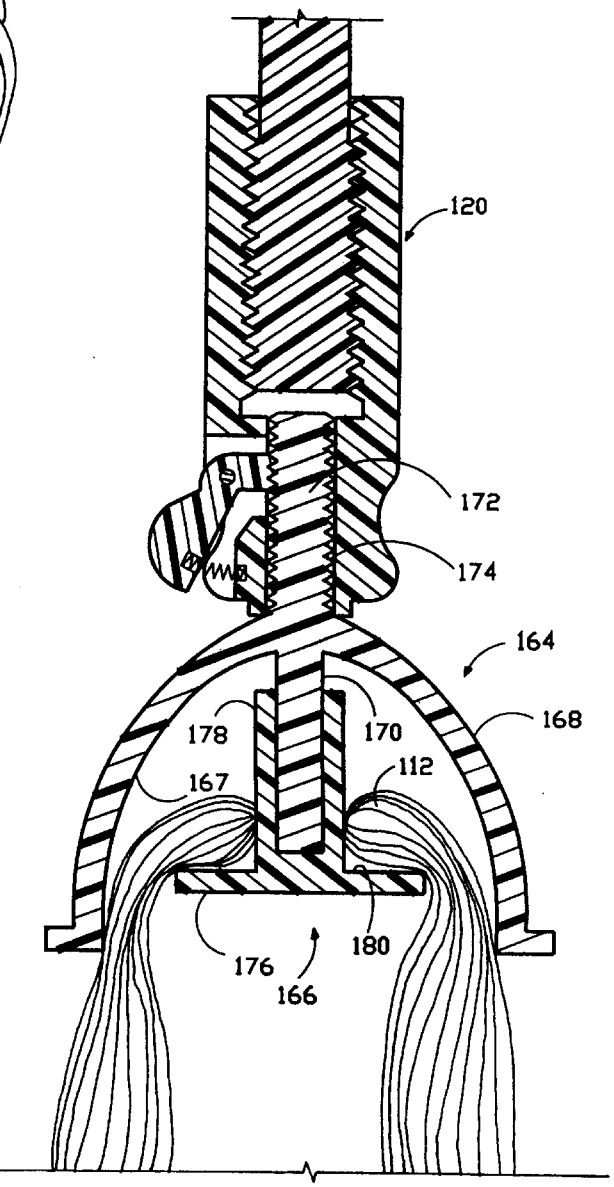
FIG. 7 is an enlarged cross-sectional view taken along line 7—7 of FIG. 6.

Referring to FIGS. 6 and 7, there is shown at 118 an adaptor assembly which is an alternative embodiment of the present invention for retaining a mop head 105 which has a fixed loop end 112 and an useable end 113 with a plurality of elongated strips. The adaptor assembly 118 comprises an adaptor member 120, a cone shaped cover member 164 and a circular disc-shaped retaining member 166. The adaptor member 120 is identical to and functions the same as the adaptor member 20 in the preceding embodiment, and the description thereof will not be repeated. The adaptor member parts are numbered correspondingly with 100 added to each reference number, and only the new components will now be described in detail below.

The cone shaped member 164 has an interior concave surface 167, an exterior convex surface 168, a central interior protruding shaft 170 extending from the concave surface 167, and a central exterior protruding shaft 172 extending from the convex surface 168. The exterior protruding shaft 172 has screw threads 174 so that the adaptor member 120 can be adapted thereon, which is similar to the preceding embodiment.

The circular disc-shaped member 166 has a circular portion 176 and a hollow cylindrical sleeve portion 178 which is integrally connected to the circular portion 176 and extends upwardly from an abutting surface 180 of the circular portion 176. The circular disc-shaped member 166 is installed by inserting the hollow cylindrical sleeve portion 178 through an aperture provided on the fixed loop end 112 of the standard loop mop 105. The central interior protruding shaft 170 of the cone shaped member 164 is then press fitted to the hollow cylindrical sleeve portion 178 of the circular disc shaped member 166 and secured thereto. The adaptor member 120 is then installed on the exterior protruding shaft 172 of the cone shaped member 164, and thereby functions the same as described in the preceding embodiment shown in FIGS. 1 through 4.

It will be appreciated that the cone-shaped cover member 164 is not limited to the way it is attached to the circular disc-shaped retaining member 166, where the interior protruding shaft 170 is press fitted to the hollow cylindrical sleeve portion 178. It is emphasized that while the press fit is the preferred method of attachment, it is also within the spirit and scope of the present invention to utilize, for example, a transverse roll pin extending through the hollow cylindrical sleeve portion 178 and the protruding shaft 170 or any other means known to one skilled in the art.

Figure 8:
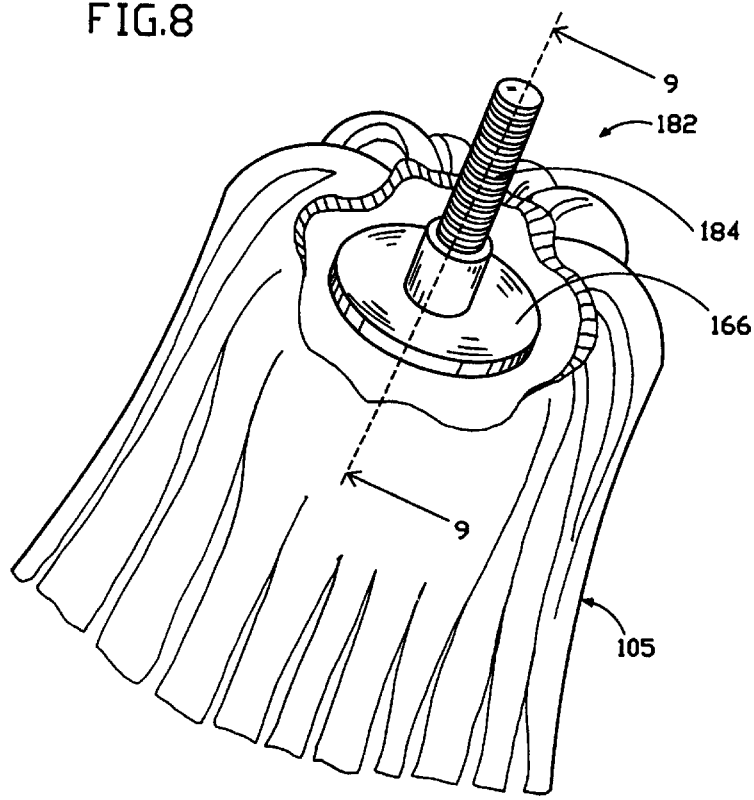
FIG. 8 is a partial cut-out perspective view of another alternative embodiment of the present invention apparatus used for adapting a mop head and a mop handle.
Figure 9:
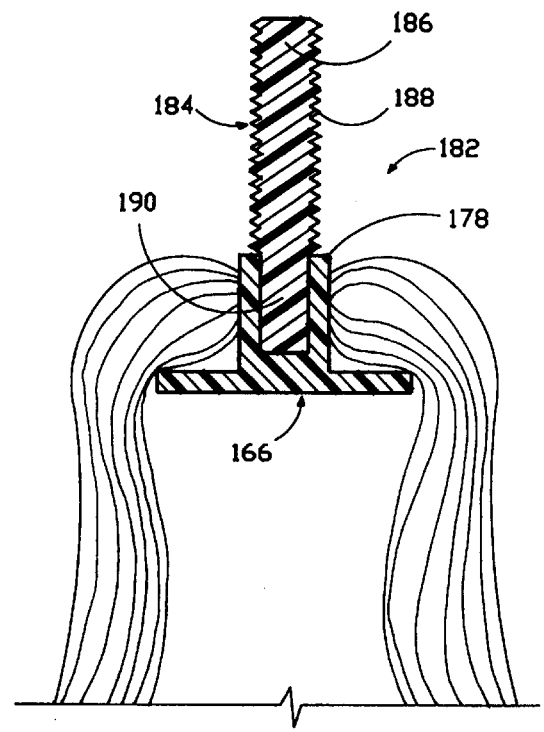
FIG. 9 is a cross-sectional view taken along line 9—9 of FIG. 8.

Referring to FIGS. 8 and 9, there is shown another adaptor assembly 182 which is another alternative embodiment of the present invention. The adaptor assembly 182 of the present invention is similar to the embodiment shown in FIGS. 6 and 7, except that the cone-shaped cover member 164 is removed and substituted with a unitary shaft member 184. The adaptor assembly 182 comprises an adaptor member not shown in FIGS. 8 and 9 because it is the same as the ones shown in the preceding figures, a circular disc-shaped retaining member 166 and a unitary shaft member 184. The adaptor member in this embodiment is identical to and functions the same as the adaptor members 20 and 120 in the preceding embodiments, and the description thereof will not be repeated. Also, the circular disc-shaped retaining member 166 is identical to and functions the same as the circular disc-shaped retaining member shown in FIGS. 6 and 7, and its description will not be repeated.

The unitary shaft member 184 has an upper portion 186 with external screw threads 188 and a lower portion 190. The unitary shaft member 184 is installed by press fitting the lower portion 190 to the hollow cylindrical sleeve portion 178 of the circular disc-shaped retaining member 166 and secured thereto. The adaptor member is then installed on the upper portion 186 of the unitary shaft member 184, and thereby functions the same as described in the preceding embodiment shown in FIGS. 1 through 4. Also, the lower portion 190 of the unitary shaft member 184 can be injected mold with the hollow cylindrical sleeve portion 178 of the circular disc-shaped retaining member 166, thereby forming a unitary one piece member, instead of two pieces.

Defined in detail, the present invention is an adaptor used in conjunction with a mop handle and a T-shaped bar attached to a mop head, where the T-shaped bar has a horizontal base portion for attachment to the mop head and a vertical portion with external screw threads, the adaptor comprising:(a) a generally cylindrical shaped body attachable on the vertical portion of the T-shaped bar and having a proximal portion with a proximal open end, a distal portion with a distal open end, a central slot extending from the proximal open end through the distal open end, and a side slot interconnecting the central slot and located adjacent to the proximal portion; (b) a pawl pivotally mounted in the side slot of the cylindrical shaped body and having a tip with inner screw threads; (c) a coil spring being installed in the side slot of the cylindrical shaped body and biasing the tip of the pawl for engaging it to the vertical portion of the T-shaped bar; (d) a thin wall disposed between the central slot and the side slot to partially divide them, so that the side slot is partially connected with the central slot; (e) the thin wall having an outward facing recess for adapting one end of the coil spring; (f) the pawl having an inward facing recess located remote from the tip for adapting the other end of the coil spring; (g) the cylindrical shaped body rotatable on the vertical portion of the T-shaped bar such that the inner screw threads on the tip of the pawl threadedly engage with the external screw threads on the vertical portion of the T-shaped bar until the proximal open end abuts against the fixed stationary end of the mop head to tighten the cylindrical shaped body thereon; and (h) the distal portion of the cylindrical shaped body having internal screw threads for threadedly attaching the mop handle; (i) whereby the pawl biased by the coil spring and its tip is engaged with the vertical portion of the T-shaped bar such that the cylindrical shaped body is locked on the vertical portion of the T-shaped bar for preventing the adaptor from sliding out from the T-shaped bar, and the cylindrical shaped body can be further threaded on the vertical portion of the T-shaped bar to precisely adjust the tightness of the adaptor, and when the pawl is pressed against the coil spring and its tip is disengaged from the vertical portion of the T-shaped bar, the cylindrical shaped body is unlocked and can be slid out from the vertical portion of the T-shaped bar for quickly releasing the T-shaped bar which holds the mop head to the cylindrical shaped body of the adaptor.

Defined broadly, the present invention is an adaptor used in conjunction with a mop handle and a bar member attached to a mop head, where the bar member has a base portion for attachment to the mop head and a threaded portion, the adaptor comprising: (a) a body being attachable on the threaded portion of the bar member and having a proximal portion with a proximal open end, a distal portion with a distal open end, a central slot extending from the proximal open end to the distal open end, and a side slot interconnecting the central slot adjacent to the proximal portion; (b) a pawl pivotally mounted in the side slot of the body and having a tip with inner screw threads; (c) a spring being installed in the side slot of the body and biasing the tip of the pawl to engage it onto the threaded portion of the bar member; (d) the body rotatable on the threaded portion of the bar member such that the inner screw threads on the pawl threadedly engage with the threaded portion of the bar member; and (e) the distal portion of the body adapted for receiving the mop handle; (f) whereby when the pawl is biased by the spring, its tip is engaged with the threaded portion of the bar member such that the body is locked on the threaded portion of the bar member for preventing the adaptor from sliding out from the bar member, and the body can be further threaded on the threaded portion of the bar member to precisely adjust the tightness of the adaptor, and when the pawl is pressed against the spring, its tip is disengaged from the threaded portion of the bar member and the body is unlocked and can be slid out from the threaded portion of the bar member for quickly releasing the bar member which holds the mop head to the body of the adaptor.

Defined more broadly, the present invention is an adaptor used in conjunction with a mop handle and a holding member attached to a mop head, the holding member having a threaded portion, the adaptor comprising: (a) a body having a central slot for receiving the threaded portion of the holding member and a side slot interconnecting to the central slot; (b) a pawl pivotally mounted to the body and biased by a spring such that its tip is engaged onto the threaded portion of the holding member, the spring being installed in the side slot; and (c) the tip of the spring biased pawl further having inner threads threadedly engaging the threaded portion of the holding member for locking the body to the holding member; (d) whereby when the pawl is biased by the spring, its tip is engaged with the threaded portion of the holding member such that the body is locked on the threaded portion of the holding member for preventing the adaptor from sliding out from the threaded portion of the holding member, and the body can be further threaded on the threaded portion of the holding member to precisely adjust the tightness of the adaptor, and when the spring biased pawl is pressed against the spring, its tip is disengaged from the threaded portion of the holding member and the body is unlocked and can be slid out from the threaded portion of the holding member for quickly releasing the holding member which holds the mop head to the body of the adaptor.

Defined alternatively in detail, the present invention is an apparatus for adapting a mop handle and a mop head which is made from a plurality of elongated strips, the apparatus comprising: (a) a retaining member having a circular base portion and a hollow cylindrical sleeve portion integrally connected to the base portion for retaining the mop head; (b) a cone-shaped cover member having a concave interior surface, a convex exterior surface, a central interior protruding shaft extending from the concave surface and a central exterior protruding shaft extending from the convex surface, the interior protruding shaft press fitted within the hollow cylindrical sleeve portion of the retaining member such that the cone shaped cover member abuts against the mop head, the exterior protruding shaft having screw threads; (c) an adaptor member having a generally cylindrical shaped body, the cylindrical shaped body having a proximal portion with a proximal open end, a distal portion with a distal open end, a central slot extending from the proximal open end through the distal open end, and a side slot interconnecting the central slot and located adjacent to the proximal portion; (d) a pawl pivotally mounted in the side slot of the cylindrical shaped body of the adaptor member and having a tip with inner screw threads; (e) a coil spring being installed in the side slot of the cylindrical shaped body of the adaptor member and biasing the tip of the pawl for engaging it to the external protruding shaft of the cone-shaped cover member; (f) a thin wall disposed between the central slot and the side slot to partially divide them, so that the side slot is partially connected with the central slot; (g) the thin wall having an outward facing recess for adapting one end of the coil spring; (h) the pawl having an inward facing recess located remote from the tip for adapting the other end of the coil spring; (i) the cylindrical shaped body of the adaptor member rotatable on the external protruding shaft of the cone-shaped cover member such that the inner screw threads on the pawl threadedly engage with the screw threads on the external protruding shaft of the cone shaped cover member; and (j) the distal portion of the adaptor member having internal screw threads for threadedly attaching the mop handle thereto; (k) whereby when the pawl is biased by the coil spring, its tip is engaged with the external protruding shaft of the cone-shaped cover member such that the cylindrical shaped body of the adaptor member is locked on the external protruding shaft of the cover member for preventing the adaptor member from sliding out from the external protruding shaft of the cover member, and the cylindrical shaped body of the adaptor member can be further threaded on the external protruding shaft of the cover member to precisely adjust the tightness of the cylindrical shaped body of the adaptor member, and when the pawl is pressed against the coil spring, its tip is disengaged from the external protruding shaft of the cover member and the cylindrical body of the adaptor member is unlocked and can be slid out from the external protruding shaft of the cover member for quickly releasing the cover member which holds the mop head to the cylindrical shaped body of the adaptor member.

Defined alternatively broadly, the present invention is an apparatus for adapting a mop handle and a mop head which is made from a plurality of elongated strips, the apparatus comprising: (a) a retaining member having a base portion and a hollow sleeve portion integrally attached to the base portion for retaining the mop head; (b) a cover member having a lower side, an upper side, a protruding shaft extending from the lower side, and a protruding shaft extending from the upper side, the protruding shaft on the lower side press fitted within the hollow sleeve portion of the retaining member such that the cover member abuts against the mop head, the protruding shaft on the upper side having screw threads; (c) an adaptor member having a proximal portion with a proximal open end, a distal portion with a distal open end, a central slot extending from the proximal open end through the distal open end, and a side slot interconnecting the central slot and located adjacent to the proximal portion; (d) a pawl pivotally mounted in the side slot of the adaptor member and having a tip with inner screw threads; (e) a spring being installed in the side slot of the adaptor member and biasing the tip of the pawl for engaging it to the protruding shaft on the upper side of the cover member; (f) the adaptor member rotatable on the protruding shaft on the upper side of the cover member such that the inner screw threads on the pawl threadedly engage with the screw threads on the protruding shaft of the upper side of the cover member; and (g) the distal open end of the distal portion of the adaptor member adapted for receiving the mop handle thereto; (h) whereby when the pawl is biased by the spring, its tip is engaged with the protruding shaft on the upper side of the cover member such that the adaptor member is locked on the protruding shaft on the upper side of the cover member for preventing the adaptor member from sliding out from the protruding shaft on the upper side of the cover member, and the adaptor member can be further threaded on the protruding shaft on the upper side of the cover member to precisely adjust the tightness of the adaptor member, and when the pawl is pressed against the spring, its tip is disengaged from the protruding shaft on the upper side of the cover member and the adaptor member is unlocked and can be slid out from the protruding shaft on the upper side of the cover member for quickly releasing the cover member which holds the mop head to the adaptor member.

Defined alternatively more broadly, the present invention is an apparatus for adapting a mop handle and a mop head which is made from a plurality of elongated strips, the apparatus comprising: (a) a retaining means having a base portion and a sleeve portion attached to the base portion for retaining the mop head; (b) a shaft having a lower portion and an upper portion, the lower portion installed to the sleeve portion of the retaining means, the upper portion having threads; (c) an adaptor means having a central slot and a side slot interconnecting the central slot, the central slot adapted to receive the upper portion of the shaft; (d) a pawl pivotally mounted to the adaptor means and biased by a spring such that its tip is engaged onto the upper portion of the shaft, the spring being installed in the side slot of the adaptor means; and (e) the tip of the spring biased pawl further having inner threads threadedly engaging the threads on the upper portion of the shaft for locking the adaptor means to the shaft; (f) whereby, the pawl biased by the spring and its tip is engaged with the upper portion of the shaft such that the adaptor means is locked on the shaft for preventing the adaptor means from sliding out on the shaft, and the adaptor means can be further threaded on the shaft to precisely adjust the tightness of the adaptor means, and when the pawl is pressed against the spring and its tip is disengaged from the lower portion of the shaft, the adaptor means is unlocked and can be slid out on the shaft for quickly releasing the shaft.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An adaptor used in conjunction with a mop handle and a T-shaped bar attached to a mop head having a fixed stationary end, where the T-shaped bar has a horizontal base portion for attachment to the mop head and a vertical portion with external screw threads, the adaptor comprising:

a. a generally cylindrical shaped body attachable on said vertical portion of said T-shaped bar and having a proximal portion with a proximal open end, a distal portion with a distal open end, a central slot extending from the proximal open end through the distal open end, and a side slot interconnecting the central slot and located adjacent to the proximal portion;

b. a pawl pivotally mounted in said side slot of said cylindrical shaped body and having a tip with inner screw threads;

c. a coil spring being installed in said side slot of said cylindrical shaped body and biasing said tip of said pawl for engaging said tip to said vertical portion of said T-shaped bar;

d. a thin wall disposed between said central slot and said side slot to partially divide them, so that said side slot is partially connected with said central slot;

e. said thin wall having an outward facing recess for adapting one end of said coil spring;

f. said pawl having an inward facing recess located remote from said tip for adapting the other end of said coil spring;

g. said cylindrical shaped body rotatable on said vertical portion of said T-shaped bar such that said inner screw threads on said tip of said pawl being threadedly engagable with said external screw threads on said vertical portion of said T-shaped bar said proximal open end of said cylindrical shaped body being abuttable against said fixed stationary end of said mop head to tighten said cylindrical shaped body thereon; and h. said distal portion of said cylindrical shaped body having internal screw threads for threadedly attaching said mop handle;

i. whereby said pawl biased by said coil spring and said tip is engagable with said vertical portion of said T-shaped bar such that said cylindrical shaped body is lockable on said vertical portion of said T-shaped bar for preventing said adaptor from sliding out from said T-shaped bar, and said cylindrical shaped body is further threadable on said vertical portion of said T-shaped bar to precisely adjust the tightness of said adaptor, and when said pawl is pressed against said coil spring and said tip is disengagable from said vertical portion of said T-shaped bar, said cylindrical shaped body is unlocked and is slidable out from said vertical portion of said T-shaped bar for quickly releasing said T-shaped bar.

2. The adaptor in accordance with claim 1 wherein said cylindrical shaped body is made of plastic material.

3. The adaptor in accordance with claim 1 wherein said pawl is pivotally mounted to said cylindrical shaped body by a roll pin.

4. The adaptor in accordance with claim 1 wherein the width of said pawl is approximately the same as the width of said side slot.

5. An adaptor used in conjunction with a mop handle and a bar member attached to a mop head, where the bar member has a base portion for attachment to the mop head and a threaded portion, the adaptor comprising:

a. a body being attachable on said threaded portion of said bar member and having a proximal portion with a proximal open end, a distal portion with a distal open end, a central slot extending from the proximal open end to the distal open end, and a side slot interconnecting the central slot adjacent to the proximal portion;

b. a pawl pivotally mounted in said side slot of said body and having a tip with inner screw threads;

c. a spring being installed in said side slot of said body and biasing said tip of said pawl for engaging said tip onto said threaded portion of said bar member;

d. said body rotatable on said threaded portion of said bar member such that said inner screw threads on said pawl being threadedly engagable with said threaded portion of said bar member; and e. said distal portion of said body having internal threads for threadedly receiving said mop handle;

f. whereby when said pawl is biased by said spring, said tip is engagable with said threaded portion of said bar member such that said body is lockable on said threaded portion of said bar member for preventing said adaptor from sliding out from said bar member, and said body is further threadable on said threaded portion of said bar member to precisely adjust the tightness of said adaptor, and when said pawl is pressed against said spring, said tip is disengagable from said threaded portion of said bar member and said body is unlocked and is slidable out from said threaded portion of said bar member for quickly releasing said bar member.

6. The adaptor in accordance with claim 5 wherein said body is made of plastic material.

7. The adaptor in accordance with claim 5 further comprising a thin wall disposed between said central slot and said side slot to partially divide them, so that said side slot is partially connected with said central slot.

8. The adaptor in accordance with claim 7 wherein said thin wall has an outward facing recess for adapting to one end of said spring.

9. The adaptor in accordance with claim 8 wherein said pawl has an inward facing recess located remote from said tip for adapting to the other end of said spring.

10. The adaptor in accordance with claim 5 wherein said pawl is pivotally mounted to said body by a roll pin.

11. The adaptor in accordance with claim 5 wherein the width of said pawl is approximately the same as the width of said side slot.

12. An adaptor used in conjunction with a mop handle and a holding member attached to a mop head, the holding member having a threaded portion, the adaptor comprising:

a. a body having a central slot for receiving said threaded portion of said holding member at one end and means for receiving said mop handle at the other end, and a side slot interconnecting to the central slot;

b. a pawl pivotally mounted to said body and biased by a spring such that a tip of the pawl is engagable onto said threaded portion of said holding member, the spring being installed in said side slot; and c. said tip of said spring biased pawl further having inner threads for threadedly engaging said threaded portion of said holding member and for locking said body to said holding member;

d. whereby when said pawl is biased by said spring, said tip is engagable with said threaded portion of said holding member such that said body is lockable on said threaded portion of said holding member for preventing said adaptor from sliding out from said threaded portion of said holding member, and said body is further threadable on said threaded portion of said holding member to precisely adjust the tightness of said adaptor, and when said spring biased pawl is pressed against said spring, said tip is disengagable from said threaded portion of said holding member and said body is unlocked and is slidable out from said threaded portion of said holding member for quickly releasing said holding member.

13. The adaptor in accordance with claim 12 further comprising a thin wall disposed between said central slot and said side slot to partially divide them, so that said side slot is partially connected with said central slot.

14. The adaptor in accordance with claim 13 wherein said thin wall has an outward facing recess for adapting to one end of said spring.

15. The adaptor in accordance with claim 14 wherein said pawl has an inward facing recess located remote from said tip for adapting to the other end of said spring.

16. The adaptor in accordance with claim 12 wherein said pawl is pivotally mounted to said side slot by a roll pin.

17. An apparatus for adapting a mop handle and a mop head which is made from a plurality of elongated strips, the apparatus comprising:

a. a retaining member having a circular base portion and a hollow cylindrical sleeve portion integrally connected to the base portion for retaining said mop head;

b. a cone-shaped cover member having a concave interior surface, a convex exterior surface, a central interior protruding shaft extending from the concave surface and a central exterior protruding shaft extending from the convex surface, the interior protruding shaft press fitted within said hollow cylindrical sleeve portion of said retaining member such that the cone shaped cover member is abuttable against said mop head, the exterior protruding shaft having screw threads;

c. an adaptor member having a generally cylindrical shaped body, the cylindrical shaped body having a proximal portion with a proximal open end, a distal portion with a distal open end, a central slot extending from the proximal open end through the distal open end, and a side slot interconnecting the central slot and located adjacent to the proximal portion;

d. a pawl pivotally mounted in said side slot of said cylindrical shaped body of said adaptor member and having a tip with inner screw threads;

e. a coil spring being installed in said side slot of said cylindrical shaped body of said adaptor member and biasing said tip of said pawl for engaging said tip to said external protruding shaft of said cone-shaped cover member;

f. a thin wall disposed between said central slot and said side slot to partially divide them, so that said side slot is partially connected with said central slot;

g. said thin wall having an outward facing recess for adapting to one end of said coil spring;

h. said pawl having an inward facing recess located remote from said tip for adapting to the other end of said coil spring;

i. said cylindrical shaped body of said adaptor member rotatable on said external protruding shaft of said cone-shaped cover member such that said inner screw threads on said pawl threadedly engage with said screw threads on said external protruding shaft of said cone shaped cover member; and j. said distal portion of said adaptor member having internal screw threads for threadedly attaching said mop handle thereto;

k. whereby when said pawl is biased by said coil spring, said tip is engaged with said external protruding shaft of said cone-shaped cover member such that said cylindrical shaped body of said adaptor member is locked on said external protruding shaft of said cover member for preventing said adaptor member from sliding out from said external protruding shaft of said cover member, and said cylindrical shaped body of said adaptor member can be further threaded on said external protruding shaft of said cover member to precisely adjust the tightness of said cylindrical shaped body of said adaptor member, and when said pawl is pressed against said coil spring, said tip is disengaged from said external protruding shaft of said cover member and said cylindrical body of said adaptor member is unlocked and can be slid out from said external protruding shaft of said cover member for quickly releasing said cover member.

18. The apparatus in accordance with claim 17 wherein said retaining member is made of plastic material.

19. The apparatus in accordance with claim 17 wherein said cone-shaped cover member is made of plastic material.

20. The apparatus in accordance with claim 17 wherein said cylindrical shaped body of said adaptor member is made of plastic material.

21. The apparatus in accordance with claim 17 wherein said pawl is pivotally mounted to said cylindrical shaped body of said adaptor member by a roll pin.

22. An apparatus for adapting a mop handle and a mop head which is made from a plurality of elongated strips, the apparatus comprising:

a. a retaining member having a base portion and a hollow sleeve portion integrally attached to the base portion for retaining said mop head;

b. a cover member having a lower side, an upper side, a protruding shaft extending from the lower side, and a protruding shaft extending from the upper side, the protruding shaft on the lower side press fitted within said hollow sleeve portion of said retaining member such that the cover member is abuttable against said mop head, the protruding shaft on the upper side having screw threads;

c. an adaptor member having a proximal portion with a proximal open end, a distal portion with a distal open end, a central slot extending from the proximal open end through the distal open end for receiving said protruding shaft on said upper side of said cover member at the proximal open end and means for receiving said mop handle at the distal open end, and a side slot interconnecting the central slot and located adjacent to the proximal portion;

d. a pawl pivotally mounted in said side slot of said adaptor member and having a tip with inner screw threads;

e. a spring being installed in said side slot of said adaptor member and biasing said tip of said pawl for engaging said tip to said protruding shaft on said upper side of said cover member;

f. said adaptor member rotatable on said protruding shaft on said upper side of said cover member such that said inner screw threads on said pawl threadedly engage with said screw threads on said protruding shaft of said upper side of said cover member;

g whereby when said pawl is biased by said spring, said tip is engaged with said protruding shaft on said upper side of said cover member such that said adaptor member is locked on said protruding shaft on said upper side of said cover member for preventing said adaptor member from sliding out from said protruding shaft on said upper side of said cover member, and said adaptor member can be further threaded on said protruding shaft on said upper side of said cover member to precisely adjust the tightness of said adaptor member, and when said pawl is pressed against said spring, said tip is disengaged from said protruding shaft on said upper side of said cover member and said adaptor member is unlocked and can be slid out from said protruding shaft on said upper side of said cover member for quickly releasing said cover member.

23. The apparatus in accordance with claim 22 wherein said retaining member is made of plastic material.

24. The apparatus in accordance with claim 22 wherein said cover member is made of plastic material.

25. The apparatus in accordance with claim 22 wherein said adaptor member is made of plastic material.

26. The apparatus in accordance with claim 22 wherein said pawl is pivotally mounted to said adaptor member by a roll pin.

27. An apparatus for adapting a mop handle and a mop head which is made from a plurality of elongated strips, the apparatus comprising:

a. a retaining means having a base portion and a sleeve portion attached to the base portion for retaining said mop head;

b. a shaft having a lower portion and an upper portion, the lower portion installed to said sleeve portion of said retaining means, the upper portion having threads;

c. an adaptor means having a central slot and a side slot interconnecting the central slot, the central slot adapted to receive said upper portion of said shaft at one end of the adaptor means and having means for receiving said mop handle at the other end of the adaptor means;

d. a pawl pivotally mounted to said adaptor means and biased by a spring such that a tip of the pawl is engaged onto said upper portion of said shaft, the spring being installed in said side slot of said adaptor means; and e. said tip of said spring biased pawl further having inner threads threadedly engaging said threads on said upper portion of said shaft for locking said adaptor means to said shaft;

f. whereby said pawl is biased by said spring and said tip is engaged with said upper portion of said shaft such that said adaptor means is locked on said shaft for preventing said adaptor means from sliding out on said shaft, and said adaptor means can be further threaded on said shaft to precisely adjust the tightness of said adaptor means, and when said pawl is pressed against said spring and said tip is disengaged from said lower portion of said shaft, said adaptor means is unlocked and can be slid out on said shaft for quickly releasing said shaft.

28. The apparatus in accordance with claim 27 wherein said pawl is pivotally mounted to said adaptor means by a roll pin.

* * * * *